US006791972B1

United States Patent
Hwang

(10) Patent No.: US 6,791,972 B1
(45) Date of Patent: Sep. 14, 2004

(54) APPARATUS FOR INTERFACING A PRIVATE BRANCH EXCHANGE WITH AN ASYNCHRONOUS TRANSFER MODE NETWORK AND METHOD THEREOF

(75) Inventor: Jae-Won Hwang, Seoul (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 879 days.

(21) Appl. No.: 09/591,246

(22) Filed: Jun. 9, 2000

(30) Foreign Application Priority Data

Jun. 11, 1999 (KR) .......................... 1999-21737

(51) Int. Cl.[7] .............................................. H04L 12/66
(52) U.S. Cl. ................................ 370/352; 370/395.1
(58) Field of Search ............................... 370/352, 356, 370/395.1, 395.2, 395.4, 395.61

(56) References Cited

U.S. PATENT DOCUMENTS 5,987,025 A * 11/1999 Hokari ........................ 370/352
6,038,237 A * 3/2000 Tsuruta et al. ............. 370/395.61
6,363,064 B1 * 3/2002 Yamaguchi .................. 370/352
6,487,198 B1 * 11/2002 Pierson, Jr. ................. 370/356
6,556,568 B2 * 4/2003 Sasaki ....................... 370/395.1
6,574,220 B1 * 6/2003 Petty ........................ 370/395.4
2002/0089987 A1 * 7/2002 Sasaki ....................... 370/395.1
2003/0026284 A1 * 2/2003 Fraas et al. ............... 370/395.1

FOREIGN PATENT DOCUMENTS

AU        16429/97       9/1997
GB        2294840 A      5/1996

* cited by examiner

Primary Examiner—Salvatore Cangialosi
(74) Attorney, Agent, or Firm—Cha & Reiter, L.L.C.

(57) ABSTRACT

An apparatus for interfacing a PBX with an ATM network, comprises a circuit switch part for establishing an ATM communication channel to connect the ATM network if a subscriber requests access to the ATM network, and an ATM network switch part for converting the signaling information from the ATM communication channel into the corresponding ATM network cell that is applied to the ATM network.

12 Claims, 4 Drawing Sheets

APPARATUS FOR INTERFACING A PRIVATE BRANCH EXCHANGE WITH AN ASYNCHRONOUS TRANSFER MODE NETWORK AND METHOD THEREOF

CLAIM OF PRIORITY

This application makes reference to, incorporates the same herein, and claims all benefits accruing under 35 U.S.C. Section 119 from an application for APPARATUS FOR INTERFACING A PRIVATE BRANCH EXCHANGE WITH AN ASYNCHRONOUS TRANSFER MODE NETWORK AND METHOD THEREOF filed earlier in the Korean Industrial Property Office on Jun. 11, 1999 and there duly assigned Serial No. 21737/1999.

BACKGROUND OF THE INVENTION

1. Field of the Invention

The present invention relates to a system for interfacing a Private Branch Exchange (PBX) with an Asynchronous Transfer Mode (ATM) network.

2. Description of the Related Art

In FIG. 1, a conventional system for interfacing a Private Branch Exchange (PBX) with an Asynchronous Transfer Mode (ATM) network is illustrated. In the prior art system, the PBX 20 is coupled to a plurality of subscriber extensions 11, 12, 13 and a central office switch 30 to provide communication service over a Public Switched Telephone Network (PSTN). Alternatively, the PBX 20 can be directly connected to the PSTN to provide communication service without any additional interface device. Moreover, the ATM network is coupled to a multimedia terminal 80 and a hub 60 via an ATM switch 40. The hub 60 of the ATM network 60 is coupled to a plurality of workstations 71, 72 to provide wide-band multimedia service.

In order for the PBX 20 to provide wide-band multimedia service through the ATM network, the PBX 20 must be connected to an ATM CES Interworking Function (ATM CES IWF) 50 to convert its signal frame into a corresponding ATM cell to be applied to the ATM switch 40. The conversion is necessary since the PBX communication process is completely different from the ATM network. The ATM CES IWF 50 serves as a proprietary interface to make a permanent virtual channel (PVC) connection between the PSTN and the ATM network to transmit the voice traffic of the PBX 20 by way of the PVC connection. Thus, in the conventional system, the ATM CEF IWF 50 must be separately provided to cross-interface between the PBX 20 and the ATM switch 40. However, the prior art system has drawbacks in that the ATM CEF IWF 50 is overloaded with the tasks of processing voice traffic calls due to the double signaling and the information exchanges occurring between two different networks. As a result, the prior art interfacing system is not efficient.

SUMMARY OF THE INVENTION

It is an object of the present invention to provide an apparatus for interfacing a PBX with an ATM network.

It is another object of the present invention to provide a method for interfacing a PBX with an ATM network.

According to the present invention, an apparatus for interfacing a PBX with an ATM network includes a circuit switch part for establishing an ATM communication channel to connect the ATM network if a subscriber requests an access to the ATM network, and an ATM network switch part for converting the signaling information from the ATM communication channel into the corresponding ATM network cell to be applied to the ATM network.

According to another aspect of the present invention, a method for interfacing a PBX with an ATM network includes the steps of establishing an ATM communication channel to connect the ATM network if a subscriber requests access to the ATM network, and converting the signaling information of the subscriber from the ATM communication channel into a corresponding ATM network cell to be applied to the ATM network.

The foregoing and other objects, features, and advantages of the invention will be apparent from the following, more detailed description of preferred embodiments as illustrated in the accompanying drawings in which reference characters refer to the same parts throughout the various views. The drawings are not necessarily to scale, the emphasis instead placed upon illustrating the principles of the invention.

BRIEF DESCRIPTION OF THE ATTACHED DRAWINGS

DETAILED DESCRIPTION OF THE PREFERRED EMBODIMENT

Figure 1:
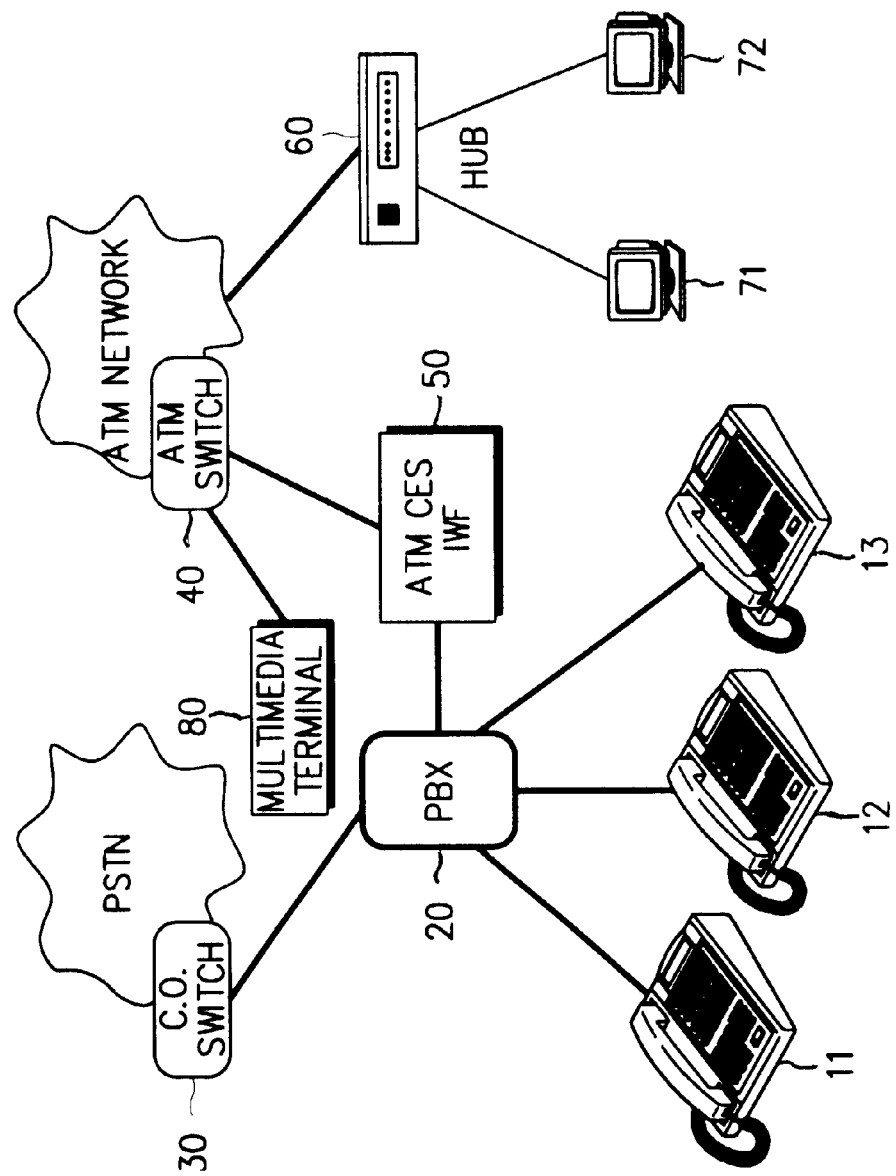
FIG. 1 is a schematic diagram for illustrating the structure of connecting a conventional PBX and an ATM network.

The foregoing and other objects, features, and advantages of the invention will be apparent from the following, more detailed description of preferred embodiments as illustrated in the accompanying drawings in which reference characters refer to the same parts throughout the various views. The drawings are not necessarily to scale, the emphasis instead placed upon illustrating the principles of the invention. The various modifications to these embodiments will be readily apparent to those skilled in the art, and other embodiments without the use of the inventive faculty. For the purpose of clarity, there are omitted detailed descriptions of the conventional parts not required to comprehend the technical concept of the present invention.

Figure 2:
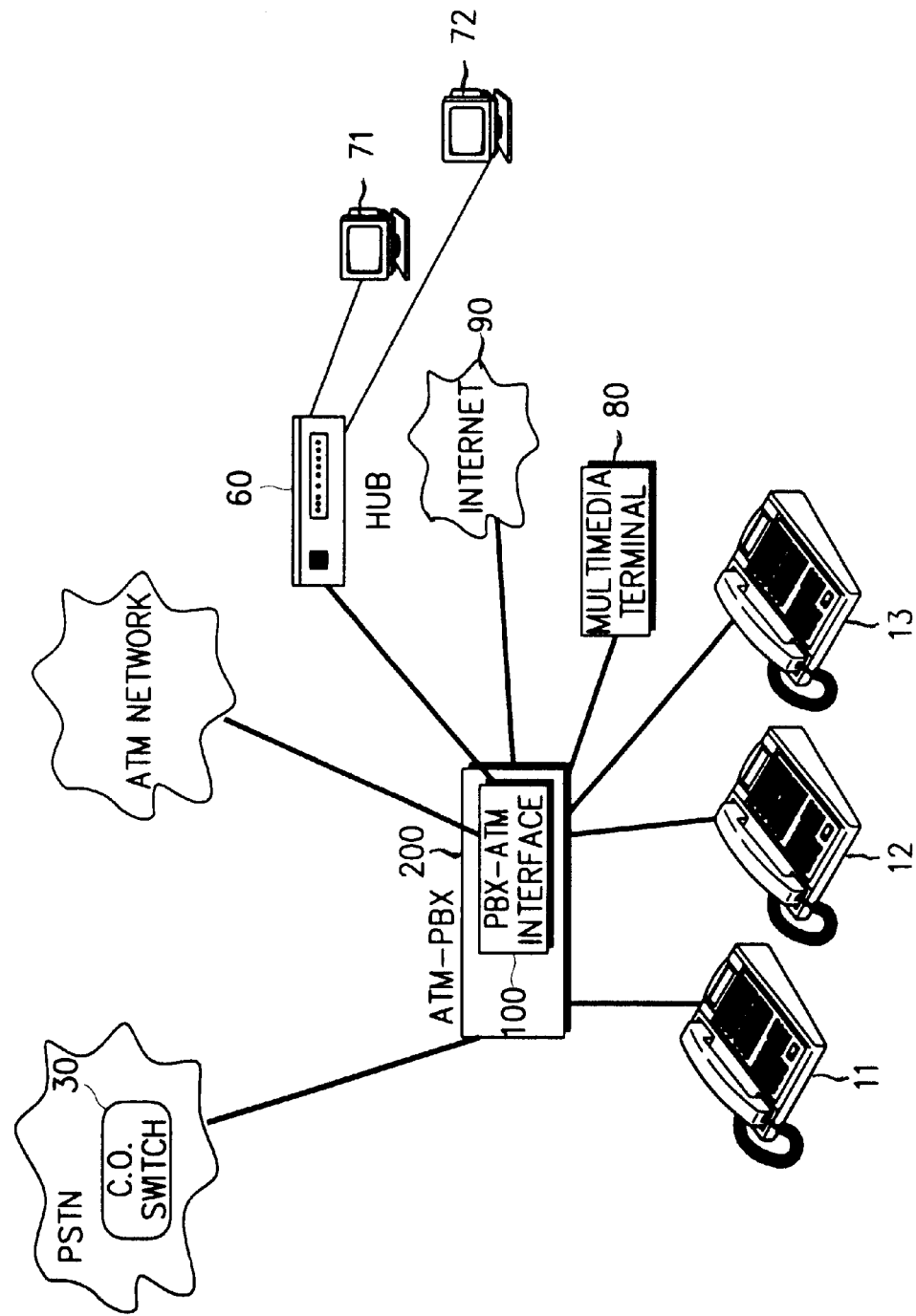
FIG. 2 is a schematic diagram for illustrating the structure of the present invention of interfacing the PBX with the ATM network.

With reference to FIG. 2, the inventive ATM-PBX interface 200 is coupled to the C. O. switch 30 of the PSTN and the multiple subscriber extensions 11, 12, 13 to communicate with one another through extension lines. A PBX-ATM interface 100 is directly coupled to an ATM network, a hub 60 which is in turn connected to a plurality of work stations 71, 72, a multimedia terminal 80, and the Internet 90. Accordingly, the present invention provides for conversion from PBX to ATM service and from ATM to PBX service.

Figure 3:
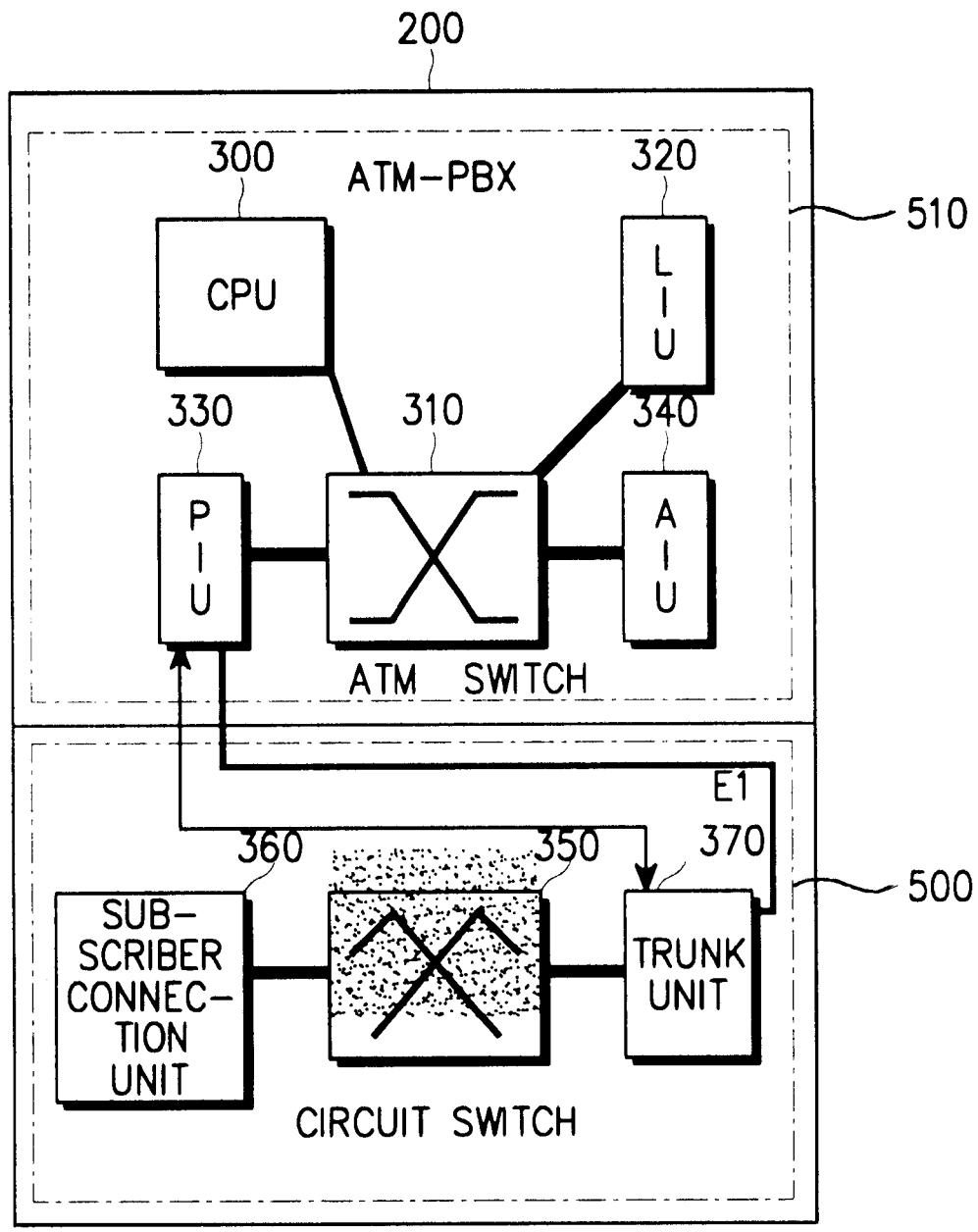
FIG. 3 is a block diagram for illustrating the internal structure of the PBX designed to interface with the ATM network according to the present invention; and, FIG. 4 is a block diagram for illustrating the internal structure of the PBX of FIG. 3 in more detail.

FIG. 3 illustrates a detailed description of the ATM-PBX interface 200 according to the embodiment of the present invention. As shown in FIG. 3, a CPU, coupled to the ATM switch 310, is provided to control the interfacing of the ATM-PBX 200 and the ATM network. The interface apparatus according to the present invention includes a circuit switch part 500 and an ATM switch part 510. The circuit switch part 500 includes a switch 350, a subscriber connection unit 360, and a trunk unit 370, while the ATM switch part 510 includes a switch 310, a LAN Interface Unit (LIU)

320, a Plesiochronous Interface Unit (PIU) 330, and an ATM Interface Unit (ATM) 340.

Upon receiving a call request to the PSTN network, the subscriber connection unit 360 connects the subscriber to the PSTN through the trunk unit 370 under the control of the CPU 300. However, if the subscriber requests a connection to the ATM network, the subscriber connection unit 360 transfers the signaling information to the PIU 330 through the trunk unit 370 so that the subscriber can be connected through the ATM network. In this case, the signaling information is delivered as an E1 frame to the PIU via the E1 channel.

The PIU 330 supports the Plesiochronous data service by converting the E1 frame from the trunk unit 370 into a corresponding ATM network cell to be delivered to the AIU 340 via the ATM switch 310, thereby establishing a switched virtual channel (SVC) to transfer the ATM network cell from the PIU 330 to the ATM network. Accordingly, the subscriber is provided with access to the ATM network service. Meanwhile, the LIU 320 is provided to connect the subscriber to a Local Access Network (LAN), i.e., the Internet, if such request is detected by the subscriber connection unit 360.

Figure 4:
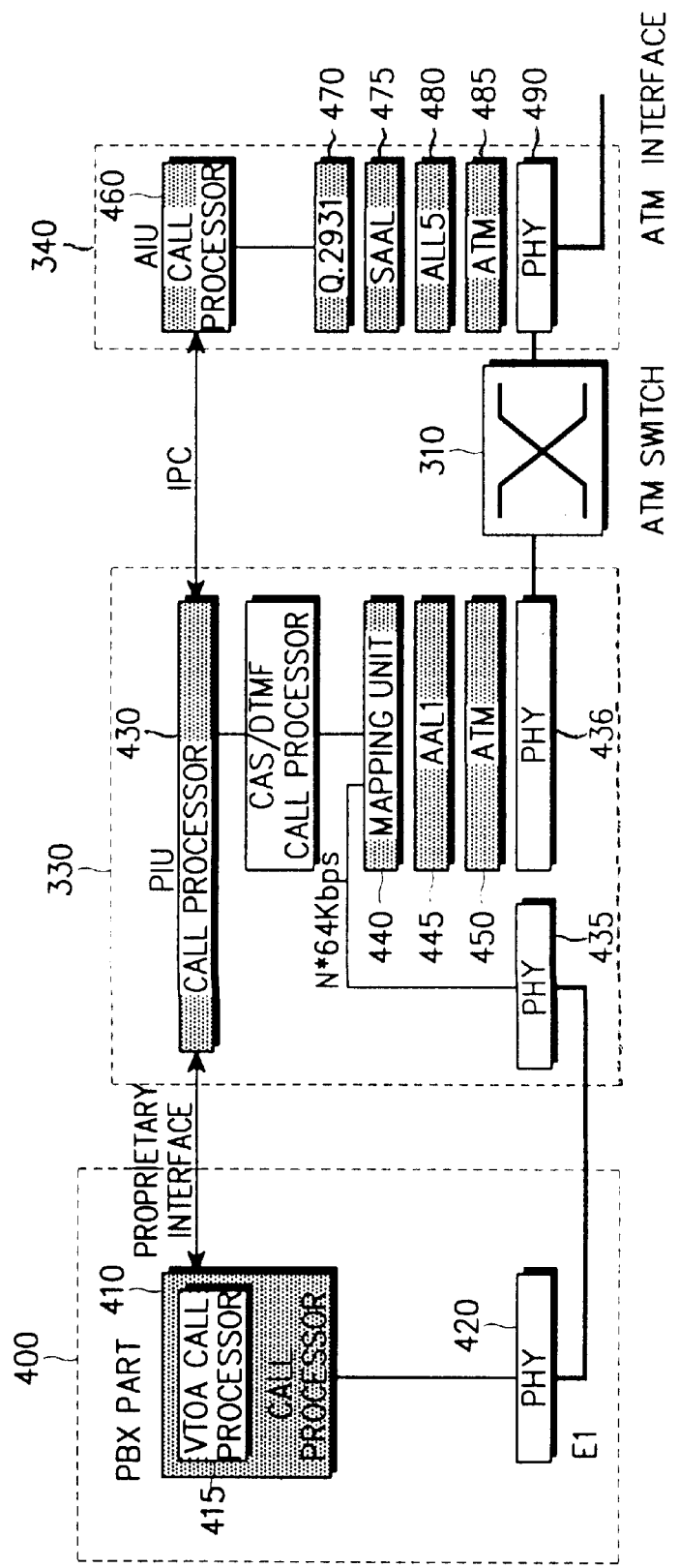

Describing more specifically the process of interfacing the ATM-PBX with the ATM network in connection with FIG. 4, the PBX part 400 is provided with a call processor 410 for processing the detected call from the subscriber connection unit 360. The PBX part 400 also includes a VTOA call processor 415 to support the Voice and Telephone Over ATM (VTOA) of the ATM Forum if the subscriber requests a call connection through an ATM network. The signaling information of the detected ATM network request call is transferred to a call processor 430 of the PIU 330 via the E1 channel of the proprietary interface.

The PIU 330 comprises an CAS/DTMF signal processor 440, a mapping unit 440, an ATM Adaptation Layer 1 (AAL1) 445, and an ATM converter 450 to convert the E1 frame from the PBX part 400 into the corresponding ATM cell to be applied to the AIU 340. The PIU 330 performs the Inter-Processor Communication (IPC) with the AIU 340 to establish a switched virtual channel (SVC) to transfer the ATM cell through the established SVC channel. To this end, the Q.2931 470 and the SAAL (Signaling AAL) 475 protocols are employed. Reference symbols PHY 420, PHY 435, PHY 436, and PHY 490 represent the physical layers to make the physical connection with the ATM network. The ATM switch 310 is provided for interface, as described above, between the PIU 330 and the AIU 340.

Accordingly, the voice E1 frame from the PBX part 400 is converted by the PIU 330 into a corresponding ATM network cell to be transferred to the AIU 340 through the ATM switch 310. As the ATM virtual connection operates at a Constant Bit Rate (CBR), the AAL1 445 provides the Constant Bit Rate (CBR) service by converting the E1 frame into the ATM network cell and transmits the voice data in real time to prevent both the delay and the voice error. Finally, the ATM network cell is transmitted through the AIU 340 to the ATM network.

Hence, the invention provides a means for directly connecting the subscriber's call to the ATM network without procuring any additional device, such as ATM CES IWF, thereby eliminating the repeated signaling process and the error associated with such process in the prior art system.

While the present invention has been described in connection with specific embodiments accompanied by the attached drawings, it will be readily apparent to those skilled in the art that various changes and modifications may be made thereto without departing from the gist of the present invention.

What is claimed is:

1. An apparatus for interfacing a private branch exchange (PBX) with an asynchronous transfer mode (ATM) network, comprising:
   a circuit switch means for adapted for directly connecting a subscriber depending on a subscriber's request, to a mutually exclusive: (1) a public switched telephone network and (2) an ATM network said circuit switch means connecting said subscriber to an ATM network by establishing an ATM communication channel to said ATM network upon receiving a request to access said ATM network from a subscriber;
   an ATM switch means for converting a signaling information received from said ATM communication channel into a corresponding ATM network cell to be applied to said ATM networks;
   wherein said circuit switch means comprises a trunk means for transmitting the signaling information as a frame upon receiving the request to access said ATM network from said subscriber and said trunk means is coupled to a public switched telephone network (PSTN).

2. The apparatus as defined in claim 1, wherein said signaling information is exchanged between said circuit switch means and said ATM network switch means via an E1 transmission channel.

3. The apparatus as defined in claim 1, wherein said circuit switch means comprises a subscriber interface for interfacing with said subscriber.

4. The apparatus as defined in claim 1, further comprising a control means for providing the ongoing operation of said circuit switch means and said ATM switch means.

5. The apparatus as defined in claim 2, wherein said ATM network switch means further comprising:
   a Plesiochronous interface for converting said E1 frame from said trunk part into the corresponding ATM network cell; and,
   an ATM network interface for establishing a switched virtual channel (SVC) connection to transfer said converted ATM network cell to said ATM network.

6. The apparatus as defined in claim 5, wherein said ATM network switch means further comprising a local interface for providing a connection to a Local Access Network (LAN) upon receiving a request to access said LAN from said subscriber.

7. An apparatus for selectively interfacing a private branch exchange (PBX) with an asynchronous transfer mode (ATM) network, comprising:
   a trunk unit for transmitting a signaling information requesting access to said ATM network from a subscriber as an E1 frame;
   a Plesiochronous interface unit for converting said E1 frame from said trunk part into a corresponding ATM network cell; and,
   an ATM network interface unit for establishing a switched virtual channel (SVC) to transfer said converted ATM network cell to said ATM network;
   subscriber interface for interfacing with said subscriber; and
   wherein said subscriber interface is adapted upon subscriber request to directly connect to a mutually exclusive (1) public switched telephone network, and (2) an ATM network.

8. The apparatus as defined in claim 7, wherein said trunk unit is coupled to a public switched telephone network (PSTN).

9. The apparatus as defined in claim 7, further comprising a control means for providing the ongoing operation of said trunk unit, said Plesiochronous interface unit, and said ATM network interface unit.

10. A method for interfacing a PBX with an ATM network, comprising the steps of:
- establishing an ATM communication channel to connect directly said ATM network and said PBX upon receiving a request from a subscriber to access said ATM network; and,
- converting the signaling information of said subscriber request received from said established ATM communication channel into a corresponding ATM network cell to be applied to said ATM network;
- wherein the step of establishing said ATM communication channel further comprises the steps of:
- determining whether the request from said subscriber is a connection for a Public Switched Telephone Network (PSTN) or said ATM network and the direct connection is mutually exclusive of the PSTN and the ATM network; and,
- transmitting the signaling information as an E1 frame if the request for said ATM network connection is received from said subscriber.

11. The method as defined in claim 10, wherein the step of converting the signaling information of said subscriber request received from said ATM communication channel into the corresponding ATM network cell further comprises the steps of:
- converting said E1 frame into the corresponding ATM network cell; and,
- establishing a switch virtual channel (SVC) to transfer said converted ATM network cell to said ATM network.

12. A method for interfacing a PBX with an ATM network, comprising the steps of:
- determining whether a subscriber requests a direct connection to a Public Switched Telephone Network (PSTN) or said ATM network, said PSTN and said ATM network being mutually exclusive;
- transmitting the signaling information of said subscriber request as an E1 frame if the request for said ATM network connection is received from said subscriber;
- converting said E1 frame into the corresponding ATM network cell; and,
- establishing a switch virtual channel (SVC) to transfer said converted ATM network cell to said ATM network.

* * * * *